US012619411B2

(12) United States Patent
Paccapeli

(10) Patent No.: US 12,619,411 B2
(45) Date of Patent: May 5, 2026

(54) AUTOMATED FUNCTIONAL-SAFETY EVALUATION AND DEPLOYMENT OF A SOFTWARE PACKAGE

(71) Applicant: RED HAT, INC., Raleigh, NC (US)

(72) Inventor: Roberto Paccapeli, Rome (IT)

(73) Assignee: Red Hat, Inc., Raleigh, NC (US)

( * ) Notice: Subject to any disclaimer, the term of this patent is extended or adjusted under 35 U.S.C. 154(b) by 553 days.

(21) Appl. No.: 18/069,730

(22) Filed: Dec. 21, 2022

(65) Prior Publication Data

US 2024/0211226 A1     Jun. 27, 2024

(51) Int. Cl.
*G06F 8/61* (2018.01)
*G06F 8/20* (2018.01)

(52) U.S. Cl.
CPC . *G06F 8/61* (2013.01); *G06F 8/22* (2013.01)

(58) Field of Classification Search
CPC ..... G06F 8/22; G06F 8/60; G06F 8/61; G06F 8/77
See application file for complete search history.

(56) References Cited

U.S. PATENT DOCUMENTS

| | | | | |
|---|---|---|---|---|
| 7,774,743 B1 * | 8/2010 | Sanchez | ................. | G06Q 10/06 |
| | | | | 717/102 |
| 9,141,378 B2 * | 9/2015 | Fox | ........................... | G06F 8/71 |
| 9,250,884 B2 * | 2/2016 | Ravi | ................... | G06F 9/44505 |
| 12,141,291 B1 * | 11/2024 | Rappaport | ............... | G06F 8/77 |
| 2014/0109062 A1 | 4/2014 | Mahamuni | | |
| 2017/0235662 A1 * | 8/2017 | Leask | ................... | G06Q 10/00 |
| | | | | 717/125 |
| 2018/0032331 A1 | 2/2018 | Desai et al. | | |
| 2019/0205542 A1 | 7/2019 | Kao et al. | | |
| 2022/0222071 A1 | 7/2022 | Dell'Osa et al. | | |
| 2022/0342663 A1 * | 10/2022 | Barkaee | ................... | G06F 8/77 |
| 2023/0029624 A1 * | 2/2023 | Olejarz | ................... | G06F 8/77 |

* cited by examiner

*Primary Examiner* — Marina Lee
(74) *Attorney, Agent, or Firm* — Kilpatrick Townsend & Stockton LLP

(57) ABSTRACT

Some examples described herein related to automated functional-safety evaluation and deployment of a software package. As one example, a system can execute an automated scoring engine configured to analyze data associated with different phases of a software development process for a software package. Based on the data, the automated scoring engine can generate a score indicating compliance of the software package with a functional safety standard issued by a standard-setting organization. The system can then automatically control deployment of the software package to an entity based on the score.

20 Claims, 7 Drawing Sheets

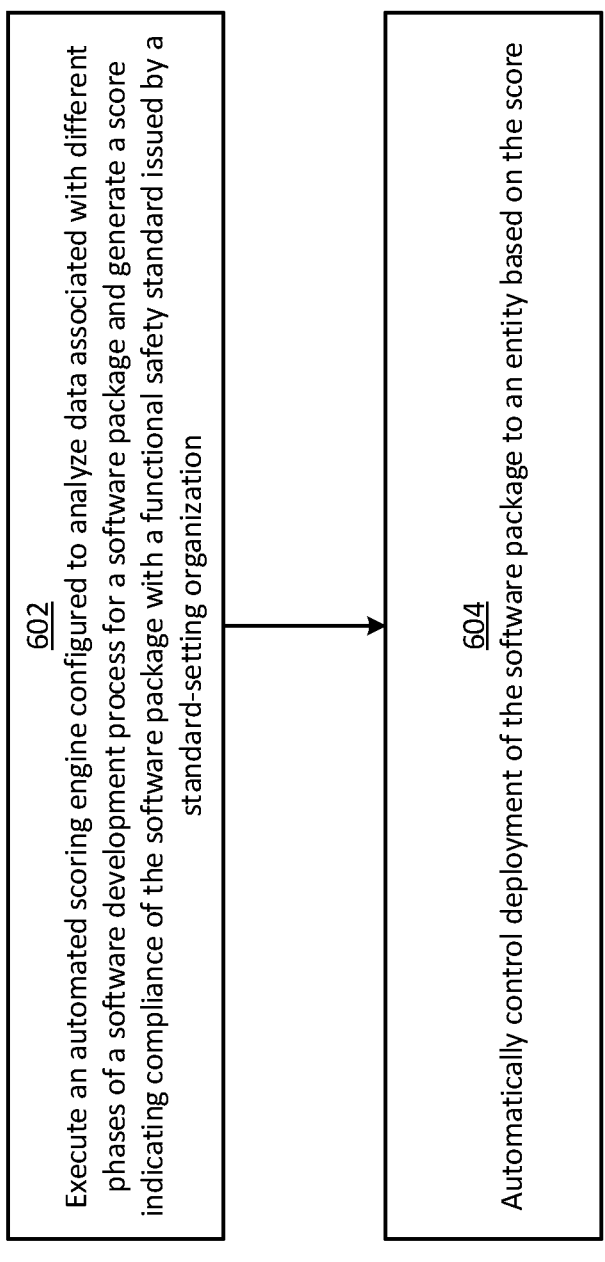

602
Execute an automated scoring engine configured to analyze data associated with different phases of a software development process for a software package and generate a score indicating compliance of the software package with a functional safety standard issued by a standard-setting organization 604
Automatically control deployment of the software package to an entity based on the score

FIG. 6

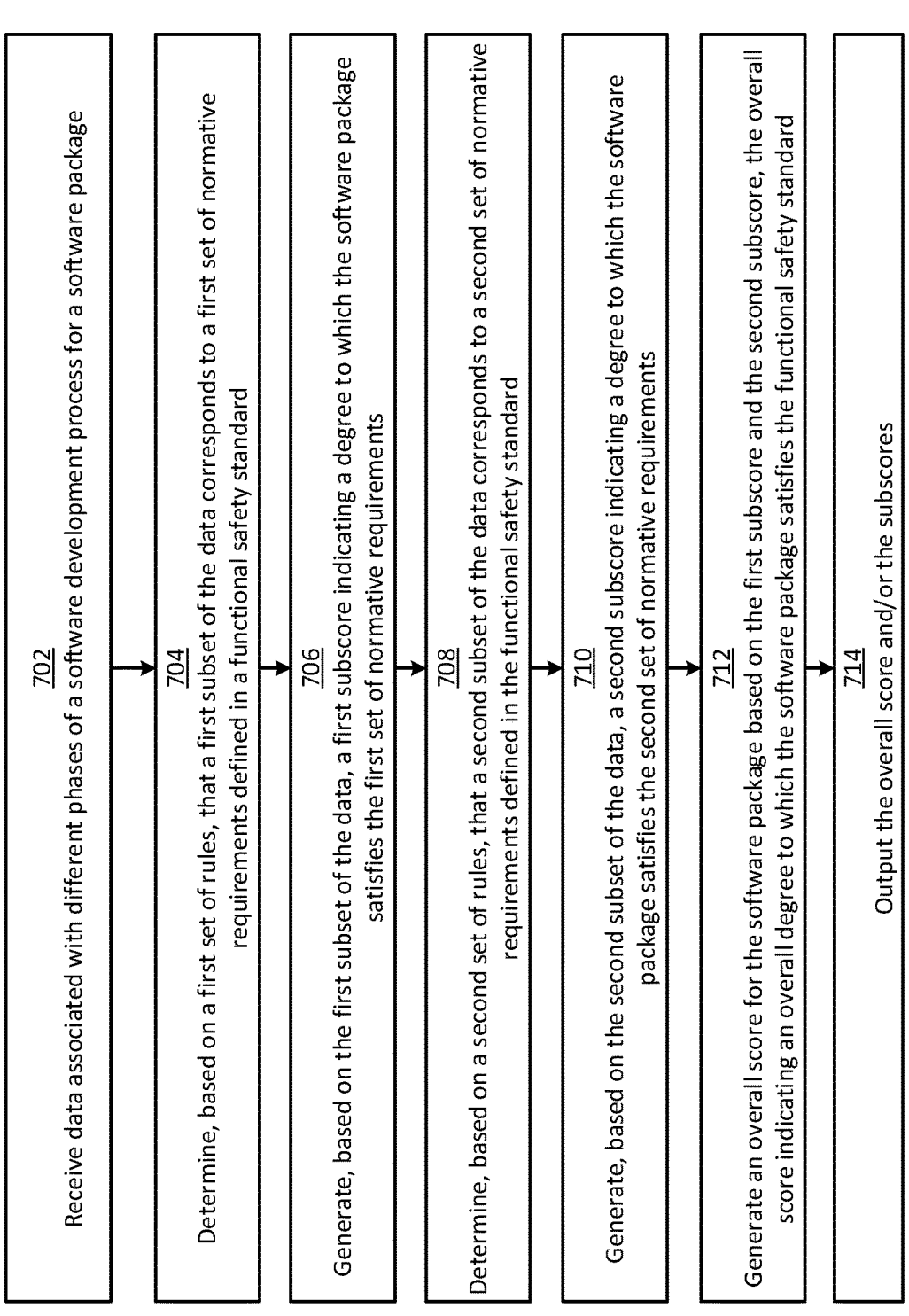

702

Receive data associated with different phases of a software development process for a software package

704

Determine, based on a first set of rules, that a first subset of the data corresponds to a first set of normative requirements defined in a functional safety standard

706

Generate, based on the first subset of the data, a first subscore indicating a degree to which the software package satisfies the first set of normative requirements

708

Determine, based on a second set of rules, that a second subset of the data corresponds to a second set of normative requirements defined in the functional safety standard

710

Generate, based on the second subset of the data, a second subscore indicating a degree to which the software package satisfies the second set of normative requirements

712

Generate an overall score for the software package based on the first subscore and the second subscore, the overall score indicating an overall degree to which the software package satisfies the functional safety standard

714

Output the overall score and/or the subscores

FIG. 7

AUTOMATED FUNCTIONAL-SAFETY EVALUATION AND DEPLOYMENT OF A SOFTWARE PACKAGE

TECHNICAL FIELD

The present disclosure relates generally to software deployment and evaluation. More specifically, but not by way of limitation, this disclosure relates to automated functional-safety evaluation and deployment of a software package.

BACKGROUND

Many organizations around the globe have developed functional safety standards for software. Functional safety is about reducing the risks of simple and complex systems, so that the function safely in the event that there is an electrical or electronic malfunction. One example of a functional safety standard is IEC 61508, defined by the International Organization for Standardization® (ISO). Another example of a standard is ISO/IEC 62304. Functional safety standards can be used to avoid or mitigate systematic failures and hardware failures, to prevent hazardous operational situations. These standards may define broad functional goals, but often the standards do not themselves prescribe the specific process that should be used to determine whether a goal is met. For example, a standard may include a broad functional goal like requiring source code to have "low complexity," but the standard may not actually specify how the level of complexity for a software application is supposed to be measured, leaving it up to a human evaluator of the software to make that decision. As a result, different organizations (and even different human evaluators within the same organization) may apply different approaches when evaluating the same code for compliance with the same safety standard, which can yield inconsistent results.

BRIEF DESCRIPTION OF THE DRAWINGS

FIG. 6 is a flowchart of an example of a process for providing automated functional-safety evaluation and deployment of a software package according to some aspects of the present disclosure.

FIG. 7 is a flowchart of an example of a process for generating subscores and an overall score for a software package according to some aspects of the present disclosure.

DETAILED DESCRIPTION

Figure 1:
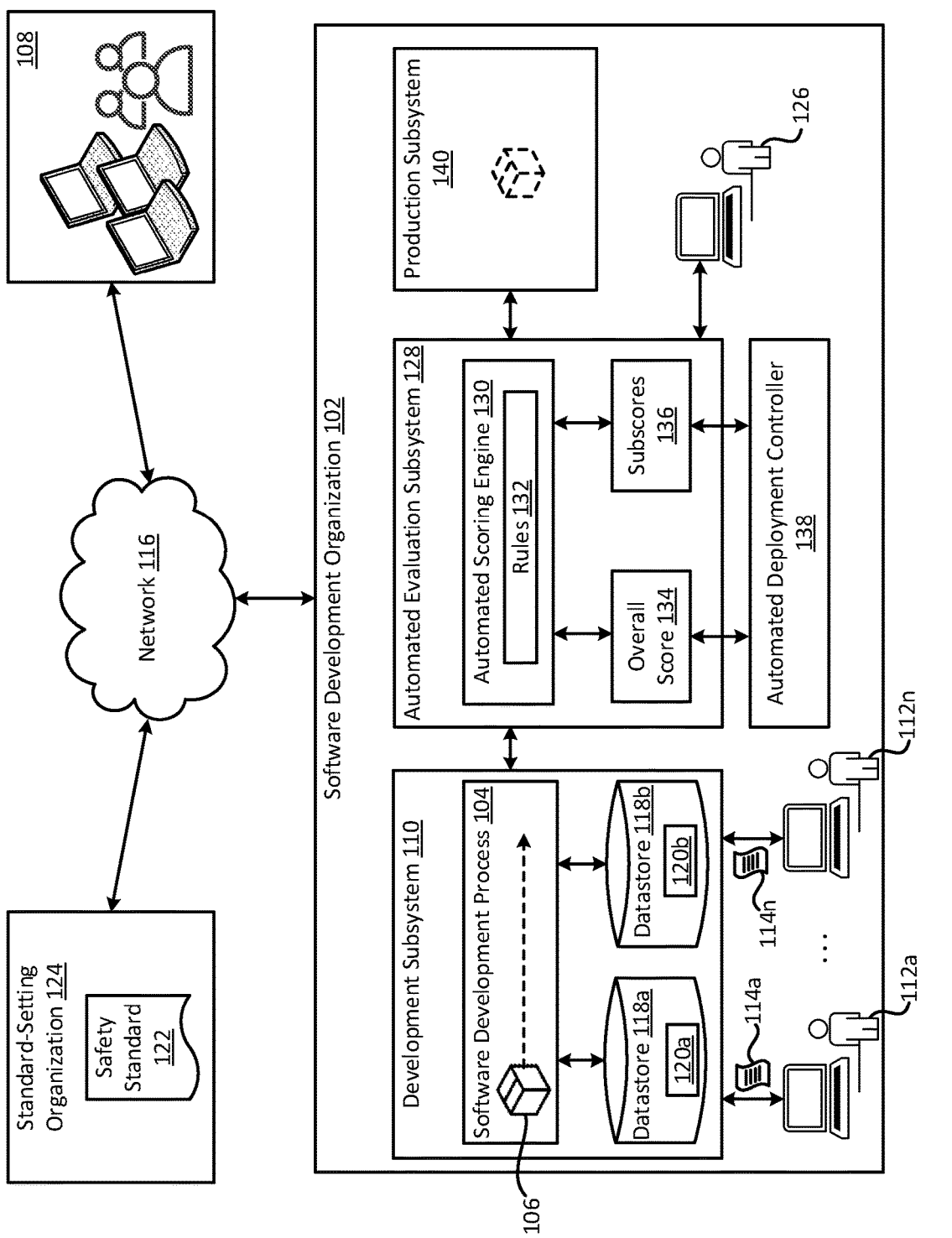
FIG. 1 is a block diagram of an example of a system for providing automated functional-safety evaluation and deployment of a software package according to some aspects of the present disclosure.

A software development organization may want or need to comply with a functional safety standard (FSS) issued by a standard-setting organization when developing a software package for end users. A software package can include programs and files that are bundled together to serve a common purpose. To test a software package's compliance with a functional safety standard, a human evaluator normally interprets the functional safety standard and obtains evidence from individuals throughout the organization to determine whether the software package complies with each normative requirement in the functional safety standard. This is a manual process that may involve the human evaluator subjectively interpreting the functional safety standard, deciding which evidence would be useful in evaluating compliance with each normative requirement in the functional safety standard, interacting with dozens of other individuals to gather the evidence, and then applying the evidence to finally arrive at a conclusion of whether the software packages complies with the functional safety standard. This is a long and arduous process that varies between software evaluators and can take a significant amount of time, which in turn may delay deployment of the software package to users (because the software package may not be allowed to be deployed to end users until its has been verified to comply with the functional safety standard). And this is often a subjective process in which different human evaluators may rely on different evidence to evaluate compliance with the same normative requirement. For example, different evaluators may rely on different test results from different types of software tests (e.g., unit tests vs. integration tests) to evaluate compliance with the same normative requirement, which can lead to different outcomes.

Some examples of the present disclosure can overcome one or more of the abovementioned problems by providing an automated process that can be repeatedly executed throughout the lifecycle of a software package, for example each time the software package is updated, to continually validate the package's compliance with a predefined functional safety standard and prevent deployment of a non-compliant package. During each iteration of the automated process, a computer system can automatically collect data about different aspects of a software development process associated with the software package. After collecting the data, the computer system can automatically analyze the data using a predefined set of rules to generate a score. The score can indicate a level of compliance of the software package with the functional safety standard. The functional safety standard can be issued by a third-party standard-setting organization, such as ISO®. After generating the score, the computer system can automatically control deployment of the software package to end users based on the score. For example, the computer system may prevent deployment of the software package to end users if the score is below a predefined threshold, and may allow deployment of the software package to end users if the score meets or exceeds the predefined threshold. By using these automated techniques, a faster and more consistent audit of software can be achieved that may prevent the accidental deployment of non-compliant software.

In some examples, the functional safety standard may include multiple areas of evaluation. So, the computer system can automatically analyze the data to determine a respective subscore for each area of evaluation in the functional safety standard. Each subscore may correspond to single area of evaluation in the functional safety standard. The computer system can then generate an overall score for the software package as a whole based on the subscores (e.g., by adding them together). If the overall score meets or exceeds a predefined threshold, the computer system may automatically push the software package to a production server for deployment to end users.

In some examples, the end users can control which software packages (e.g., updates) they receive by customizing the score thresholds to be applied to the overall scores for the software packages. For instance, each end user can interact with the computer system to select a score threshold that is acceptable to them. A first end user may select a first score threshold and a second end user may select a second score threshold that is different from the first score threshold. Based on these selections, the computer system may automatically push software packages with overall scores above the first score threshold to the first end user, and may automatically push software packages with overall scores above the second score threshold to the second end user. Through this process, the end users can customize which software packages they receive based on their risk tolerance.

The end users may also be able to control which software packages they receive by customizing the subscore thresholds to be applied to the subscores for the software packages. For instance, an end user may interact with the computer system to select a first subscore threshold and a second subscore threshold, where the second subscore threshold is different from the first subscore threshold. Based on these selections, the computer system may automatically push software packages that have a first subscore above the first subscore threshold and a second subscore above the second subscore threshold to the end user. Software packages that fail to meet one or both of the subscore thresholds may be restricted from deployment to the end user. These techniques may allow for a deeper level of granularity in the user customizations.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for providing automated functional-safety evaluation and deployment of a software package according to some aspects of the present disclosure. The system includes a software development organization 102 that may engage in a software development process 104 to create a software package 106 for deployment to end users 108, such as customers. One example of such a software development organization 102 may be Red Hat, Inc.® of Raleigh, North Carolina.

The software development organization 102 can include a development subsystem 110 through which one or more software developers 112a-n can engage in a software development process 104 to develop the software package 106. The development subsystem 110 may include code repositories, integrated development environments (IDEs), continuous integration (CI) tools, build tools, compilers, databases, and other features to assist in the development of the software package 106. The developers 112a-n may operate their respective computing devices (e.g., laptop computers, desktop computers, or tablets) to interface with the development subsystem 110. For example, the developers 112a-n may operate their respective computing devices to push code commits 114a-n and/or perform other development functions associated with the software package 106. Although the development subsystem 110 is shown as internal to the software development organization 102 in FIG. 1, it will be appreciated that the development subsystem 110 may also include components that are external to the software development organization 102. For example, the development subsystem 110 may include remote development tools (e.g., Github®) that are accessible via one or more networks 116, such as the Internet.

The software development process 104 can include any number of distinct phases, such as design, programming, testing, and validation phases. These phases may be implemented by different individuals at the software development organization 102. Data 120a-b about each phase may be stored in one or more datastores 118a-b (e.g., databases). Examples of the data 120a-b can include design specifications, source code, test results, and validation results associated with the software package 106. The test results may include the results of unit tests, integration tests, and other tests performed on software package 106. Over time, the software development organization 102 may generate multiple versions of design specifications, source code, test results, and validation results associated with the software package 106. For example, at least some of the software development process 104 (e.g., testing and validation phases) may be repeated each time the software package 106 is updated to validate its functionality, prior to the updated software package 106 being deployed to end users 108.

In some examples, the software development organization 102 may want or may be required (e.g., by law or regulation) to ensure that the software package 106 is compliant with a functional safety standard 122. A functional safety standard can be a document that defines normative requirements, specifications, and/or guidelines that can be used consistently to ensure that a product such as a software package is fit for its intended purpose. The functional safety standard 122 can be issued by a standard-setting organization 124, which in this example is different from the software development organization 102. In this arrangement, the standard-setting organization 124 may be a third party relative to the software development organization 102 and its end users 108. Though in other examples, the software development organization 102 may be the issuer of the functional safety standard 122.

A human evaluator 126 may manually evaluate the data 120a-b against the functional safety standard 122 to determine whether the software package 106 satisfies one or more normative requirements defined in the functional safety standard 122. But this can be a long, slow, tedious, subjective process that may require the human evaluator 126 to interface with the developers 112a-n and other personnel at the software development organization 102 and perform a large number of manual tasks. To help automate and facilitate this analysis, in some examples the system may include an automated evaluation subsystem 128.

The automated evaluation subsystem 128 can be configured to automatically determine a level to which the software package 106 complies with the functional safety standard 122. The automated evaluation subsystem 128 can include an automated scoring engine 130 that is configured to automatically obtain the data 120a-b associated with one or more phases of the software development process 104. After obtaining the data 120a-b, the automated scoring engine 130 can apply a set of rules 132 to the data 120a-b to determine an overall score 145 for the software package 106. The set of rules 132 may be predefined and customizable by a user, such as the human evaluator 126. The overall score 134 may be a single score that suggests the overall degree to which the software package 106 complies with the functional safety standard 122. A higher overall score may suggest a higher level of overall compliance with the functional safety standard 122, and a lower overall score may suggest a lower level of overall compliance with the functional safety standard 122.

To help generate the overall score 134, in some examples the automated scoring engine 130 can apply the set of rules 132 to the data 120a-b to determine subscores 136 for the software package 106. Each subscore may correspond to an individual area of evaluation defined in the functional safety standard 122. For example, the functional safety standard 122 may have four areas of evaluation corresponding to four phases of the software development process 104, such as the design, programming, testing, and validation phases. So, the automated scoring engine 130 can apply the set of rules 132 to the data 120a-b to determine four subscores 136 corresponding to those four areas of evaluation. A higher subscore may suggest a higher level of compliance with a set of normative requirements defined in the functional safety standard 122 in relation to the corresponding area of evaluation, and a lower subscore may suggest a lower level of compliance with those normative requirements. After generating the subscores 136, the automated scoring engine 130 can combine some or all of the subscores 136 to generate the overall score 134. For example, the automated scoring engine 130 can apply a weighted algorithm to generate the overall score 134, where the weighted algorithm weights (e.g., prioritizes) some subscores higher than others in generating the overall score 134. The weighted algorithm may, for example, add together weighted values for the subscores 136 to produce the overall score 134.

The software development organization 102 may use the automated evaluation subsystem 128 to determine whether some or all of its software packages comply with the functional safety standard 122. Because the automated evaluation subsystem 128 applies the same rules 132 to the same types of data for each software package, the results can be more consistent than may otherwise be possible. The automated evaluation subsystem 128 can also arrive at a result faster than a human evaluator 126, which can reduce delays in deploying the software package 106 to end users 108. The automated evaluation subsystem 128 can output the overall score 134 and/or the subscores 136 to the human evaluator 126 (e.g., in a graphical user interface), which can provide guidance to the human evaluator 126 should they wish to make additional manual assessments.

The system can further include an automated deployment controller 138 that can make deployment decisions based on the overall score 134. For example, the automated deployment controller 138 can receive the overall score 134 for a software package 106 and compare it to a predefined threshold. If the overall score 134 meets or exceeds the predefined threshold, the automated deployment controller 138 may automatically provide the software package 106 to a production subsystem 140 for deployment to the end users 108. If the overall score 134 is below the predefined threshold, the automated deployment controller 138 may automatically notify the human evaluator 126 and prevent deployment of the software package 106 at that time. The human evaluator 126 may then work with the developers 112a-n or other personnel to update the software package 106 so as to resolve any issues, at which point the automated evaluation subsystem 128 may evaluate the updated software package 106 and generate a new overall score. This process can iterate until the overall score meets or exceeds the predefined threshold.

In some examples, the automated deployment controller 138 may make deployment decisions based on one or more of the subscores 136. For example, the automated deployment controller 138 can receive a subscore 136 associated with the software package 106 and compare it to a predefined threshold. If the subscore 136 meets or exceeds the predefined threshold, the automated deployment controller 138 may automatically provide the software package 106 to the production subsystem 140 for deployment to the end users 108. If the subscore 136 is below the predefined threshold, the automated deployment controller 138 may automatically notify the human evaluator 126 and prevent deployment of the software package 106 at that time. The human evaluator 126 may then work with the developers 112a-n or other personnel to update the software package 106 so as to resolve any issues, at which point the automated evaluation subsystem 128 may evaluate the updated software package 106 and generate a new subscore. This process can iterate until the subscore 136 meets or exceeds the predefined threshold.

The automated deployment controller 138 may prioritize some scores over others in deciding whether to deploy the software package 106. For example, the automated deployment controller 138 may determine that a first subscore exceeds a first threshold and a second subscore is below a second threshold. This may produce a conflict. For example, if the first subscore exceeds the first threshold, the automated deployment controller 138 may normally be configured to allow deployment of the software package 106. But if the second subscore is below the second threshold, the automated deployment controller 138 may normally prevent deployment of the software package 106. To resolve this conflict, the automated deployment controller 138 may be configured to prioritize one of the subscores over the other. For example, the automated deployment controller 138 may prioritize the first subscore over the second subscore and deploy the software package 106 anyway, despite the second subscore being below the second threshold. Alternatively, the automated deployment controller 138 may be configured to be conservative and prioritize the second subscore over the first subscore. As a result, the automated deployment controller 138 may prevent deployment of the software package 106.

Similarly, the automated deployment controller 138 may prioritize the overall score 134 over subscores 136, or vice versa. For example, the automated deployment controller 138 may determine that the overall score 134 meets or exceeds an overall score threshold, which would normally be sufficient to deploy the software package 106 to the end users 108. But the automated deployment controller 138 may also determine that a subscore 136 is below a subscore threshold, which would normally be grounds to prevent deployment of the software package 106. This may produce a conflict. The automated deployment controller 138 can resolve this conflict by prioritizing one score over the other. For example, the automated deployment controller 138 may prioritize the subscore 136 over the overall score 134 for any suitable reason, such as if the subscore 136 corresponds to a particularly critical area of evaluation in the functional safety standard 122. As a result, the automated deployment controller 138 may prevent deployment of the software package 106, despite the overall score 134 meeting or exceeding the overall score threshold.

To deploy a software package 106 to the end users 108, the automated deployment controller 138 may provide (e.g., push) the software package 106 to the production subsystem 140. The production subsystem 140 can include one or more servers configured to provide the software package 106 to end users 108. For example, the servers can provide the software package 106 for download to the end users 108.

Any number or combination of end users 108 may obtain the software package 106 from the software development organization 102 via the production subsystem 140.

Figure 2:
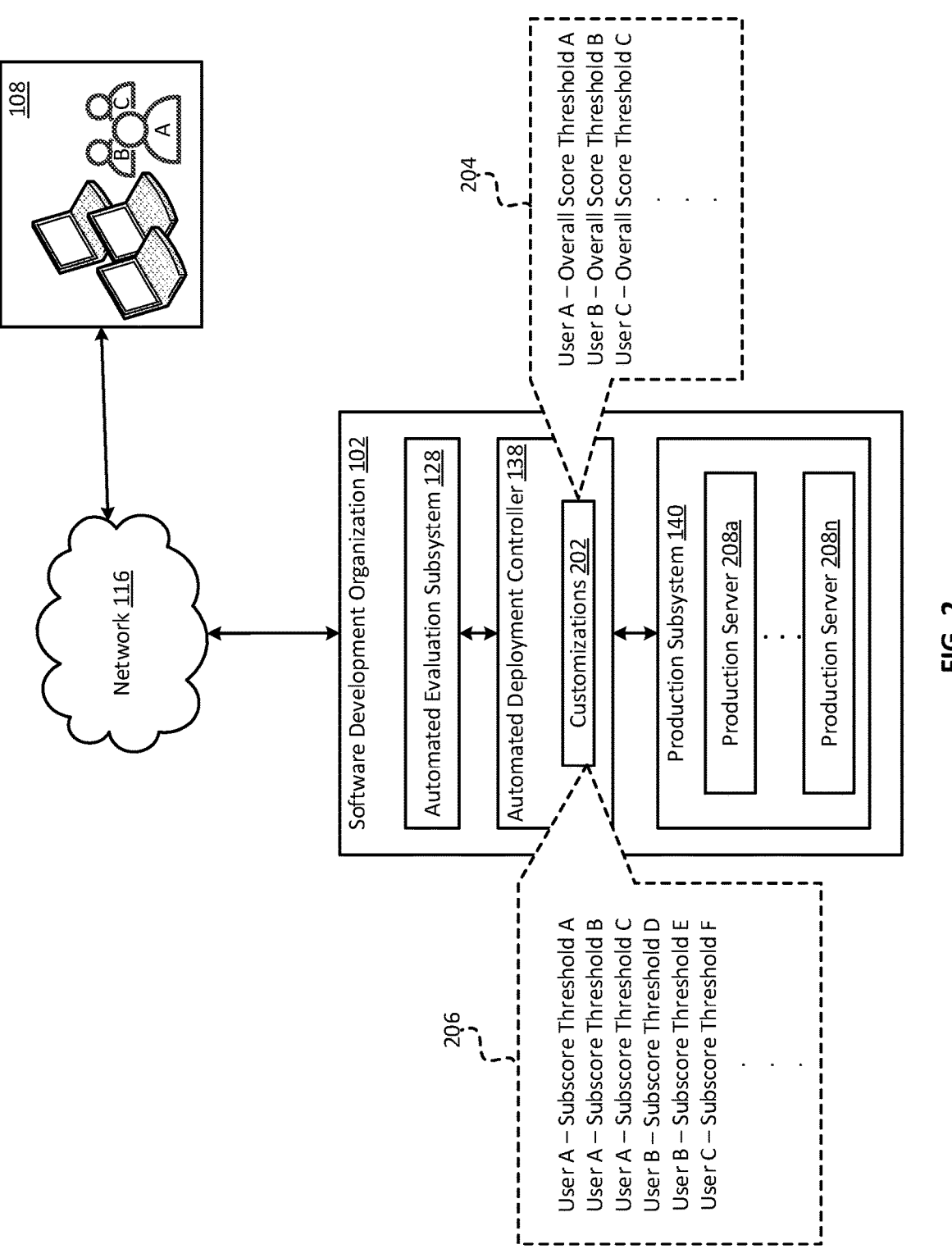
FIG. 2 is a block diagram of an example of a system for allowing end users to customize deployment of a software package based on scores according to some aspects of the present disclosure.

In some examples, an end user 108 can interact with the software development organization 102 to customize the score thresholds applied by the automated deployment controller 138, so as to control which software products are deployed to the end user 108. One example of such customizations 202 is shown in FIG. 2. The customizations 202 can include overall score customizations 204 and subscore customizations 206. As shown, End User A can interact with the software development organization 102 to select Overall Score Threshold A use by the automated deployment controller 138. End User A may interact with the software development organization 102 using any suitable means, such as an administrative interface provided by the software development organization 102. The administrative interface may include a graphical user interface that is accessible to End User A via the network 116 for customizing the overall score threshold. End Users B-C can also interact with the software development organization 102 to select Overall Score Thresholds B-C, respectively, for use by the automated deployment controller 138. Overall Score Thresholds A-C may be the same as one another or different from one another.

Depending on which overall score thresholds are met by a given software package, the automated deployment controller 138 may provide the software package to different production servers 208a-n in the production subsystem 140 for delivery to different end users. For example, the automated deployment controller 138 may provide a software package to a first production server 208a for delivery to End User A if the package's overall score exceeds Overall Score Threshold A. Additionally or alternatively, the automated deployment controller 138 may provide the software package to a second production server 208n for delivery to End User B if the package's overall score exceeds Overall Score Threshold B.

End users 108 may also be able to customize the subscore thresholds applied by the automated deployment controller 138. For example, End User A can interact with the software development organization 102 to select Subscore Thresholds A-C usable by the automated deployment controller 138 in relation to three different areas of evaluation in a functional safety standard. End User A may interact with the software development organization 102 using any suitable means, such as the administrative interface described above. End Users B-C can also interact with the software development organization 102 to select Subscore Thresholds D-F, respectively, for use by the automated deployment controller 138. Overall Score Thresholds A-F may be the same as one another or different from one another. Each end user may select the same or different subscore thresholds for different areas of evaluation in the functional safety standard. For example, End User A may select the same subscore threshold (e.g., subscore thresholds A and B) for two different areas of evaluation in the functional safety standard, and a different subscore threshold (e.g., subscore threshold C) for a third area of evaluation in the functional safety standard.

Depending on which subscore thresholds 206 are met by a given software package, the automated deployment controller 138 may provide the software package to different production servers 208a-n in the production subsystem 140 for deployment (e.g., delivery) to different end users. For example, the automated deployment controller 138 may provide a software package to a first production server 208a for deployment to End User A, if the package's subscore for a given area of evaluation exceeds Subscore Threshold A. If the package's subscore for that area of evaluation is below Subscore Threshold A, the automated deployment controller 138 may prevent deployment of the package to End User A. Additionally or alternatively, the automated deployment controller 138 may provide the software package to a second production server 208n for delivery to End User B, if the package's subscore for that same area of evaluation exceeds Subscore Threshold D. If the package's subscore for that area of evaluation is below Subscore Threshold D, the automated deployment controller 138 may prevent deployment of the package to End User B.

It will be appreciated that although FIGS. 1-2 show a certain number and arrangement of components, this is intended to be illustrative and non-limiting. Other examples may involve more components, fewer components, different components, or a different arrangement of components than is shown. For instance, the automated evaluation subsystem 128 may also be configured to perform the functionality of automated deployment controller 138 in other examples, rather than these being two separate components. Similarly, the automated deployment controller 138 may be part of the production subsystem 140 in other examples, rather than these being two separate components.

Figure 3:
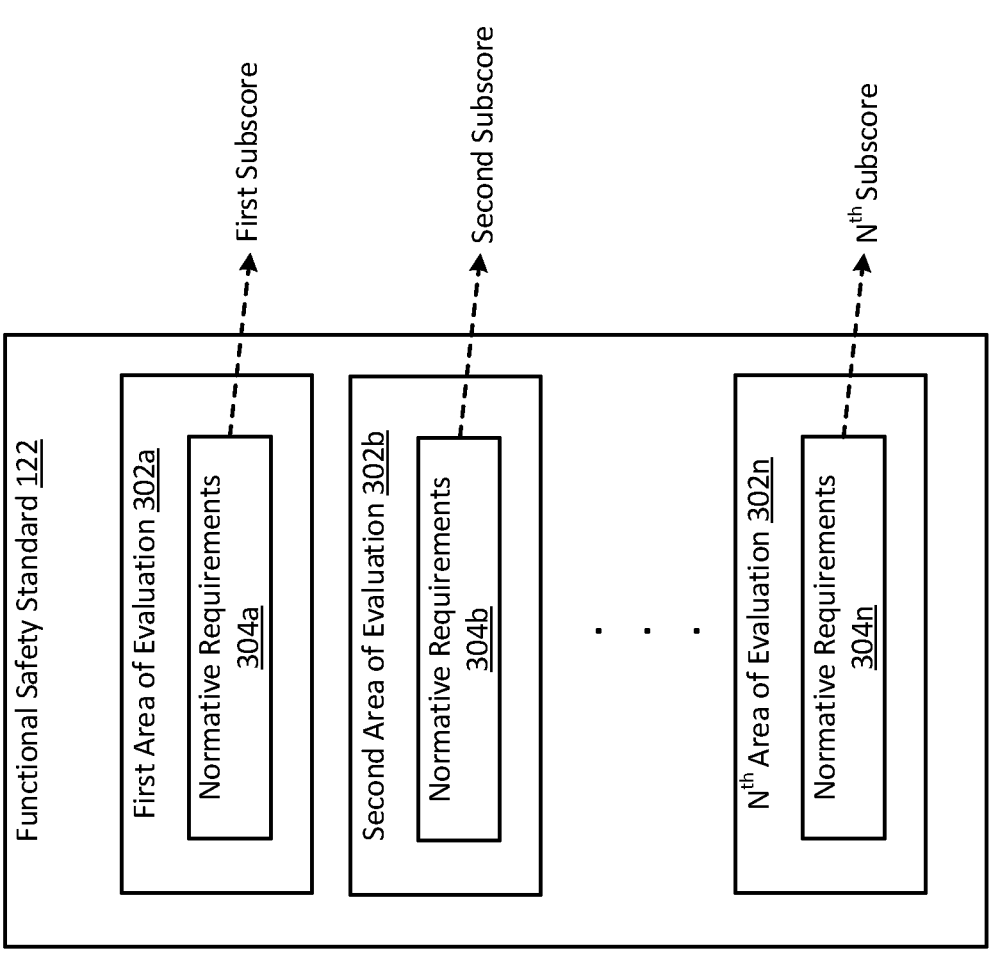
FIG. 3 is a block diagram of an example of a functional safety standard according to some aspects of the present disclosure.

As noted above, the functional safety standard 122 may cover several different areas of evaluation. One example of this is shown in FIG. 3. As shown, the functional safety standard 122 may span multiple areas of evaluation 302a-n. Each area of evaluation may correspond to a distinct phase of a software development process. For instance, a first area of evaluation 302a may correspond to a design phase for a software package, a second area of evaluation 302b may correspond to a testing phase for the software package, and a third area of evaluation 302n may correspond to a validation phase for the software package.

The functional safety standard 122 may include one or more normative requirements 304a-n to be satisfied for each area of evaluation. For example, a first area of evaluation 302a may have normative requirements 304a. Some of the normative requirements 304a may be more important than others and thus weighted higher than others. Alternatively, all of the normative requirements may be equally important and weighted the same. Either way, the automated scoring engine can determine how many of the normative requirements 304a are satisfied and, based on the weight of each normative requirement, generate a subscore for the first area of evaluation 302a. The automated scoring engine can perform similar processes for the other areas of evaluation 302b-n, based on their respective normative requirements 304b-n, to generate corresponding subscores associated with those areas. An overall score may then be generated for the software package based on the subscores. The overall score may suggest the functional integrity of the software package, according to the functional safety standard 122.

To determine which normative requirements are satisfied for a given area of evaluation, the automated scoring engine can apply rules to data generated during the software development process. An example of the rules can be rules 132 of FIG. 1, and an example of the data can be data 120a-b of FIG. 1. For instance, the automated scoring engine can obtain the results of a set of software development operations performed during different phases of the software development process for the software package. The automated scoring engine can then apply the rules to at least a portion of the data to generate a subscore for the given area of evaluation, such as the first area of evaluation 302a. The subscore can indicate a degree to which the normative requirements 304a satisfied by the software package, which in turn can indicate a degree to which the functional safety standard 122 is met by the software package. If the normative requirements 304a indicate functional goals for the software package, the subscore can indicate the extent to which the functional goals are met by the software package.

Figure 4:
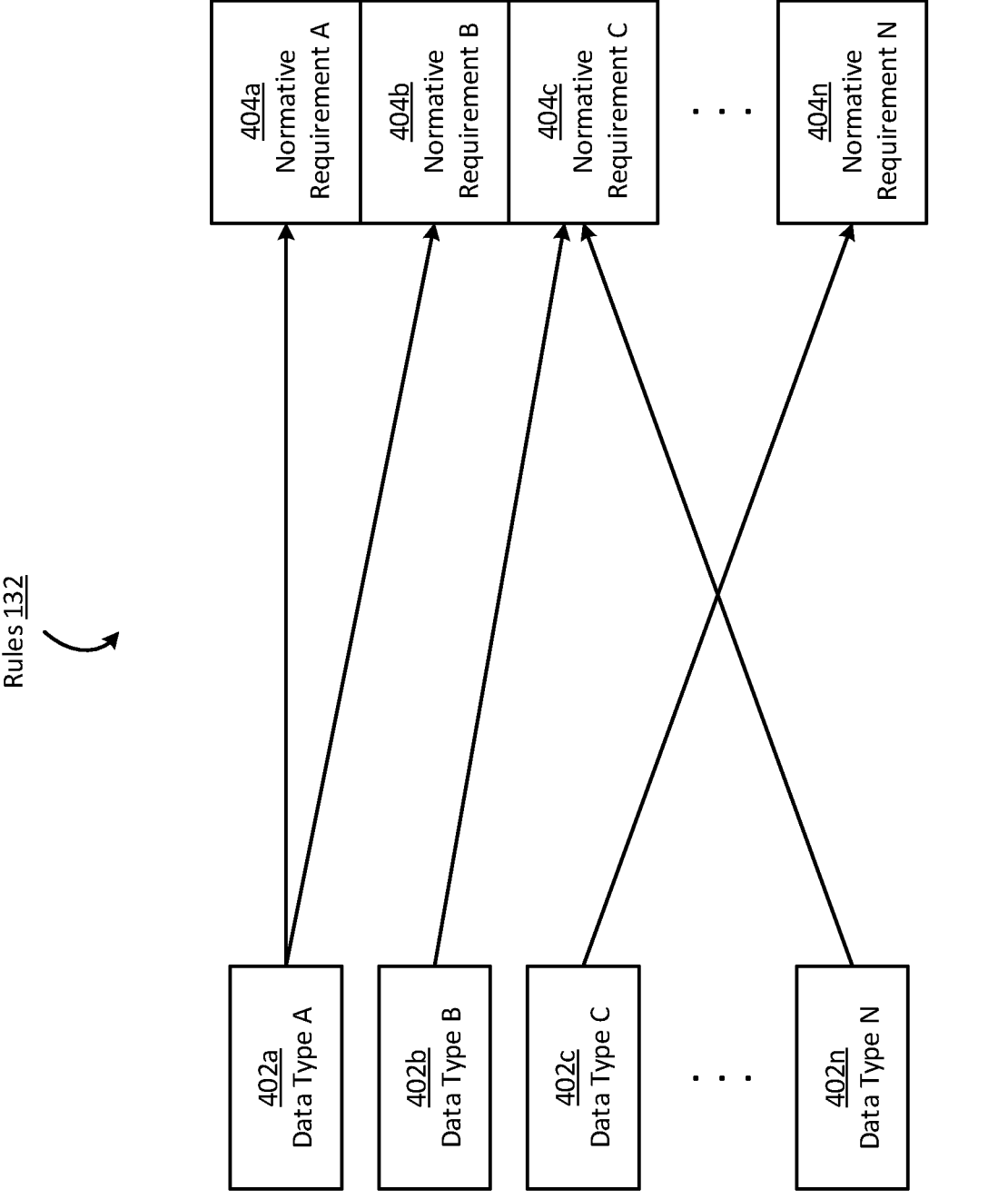
FIG. 4 is a block diagram of an example of a set of rules according to some aspects of the present disclosure.

One example of the rules 132 that can be applied by the automated scoring engine is shown in FIG. 4. The rules 132 can map different types of data 402a-n to the normative requirements 404a-n (e.g., functional requirements) defined in the functional safety standard 122. In this example, the rules 132 map Data Type A to Normative Requirements A and B. Thus, the same type of data may be used to determine a software project's compliance with multiple different normative requirements. The rules 132 also map Data Types B and N to Normative Requirement C. Thus, different types of data may be used to determine a software project's compliance with a single normative requirement. Any number and combination of types of data may be mapping, in the rules 132, to any number and combination of normative requirements in the functional safety standard 122. Through this mapping, the automated scoring engine can determine which data to obtain and evaluate in relation to a given normative requirement to develop a score (e.g., subscore) related to that normative requirement.

As one particular example, the automated scoring engine can access the rules 132 to determine that is to retrieve Data Type A to evaluate the software package's compliance with Normative Requirement A. So, the automated scoring engine can obtain Data Type A from one or more datastores, such as datastores 120a-b. One example of Data Type A may be test results from a testing phase of the software development process for the software package. After obtaining Data Type A, the automated scoring engine can then evaluate Data Type A against Normative Requirement A to determine a subscore indicating a degree to which the software package satisfies Normative Requirement A.

Figure 5:
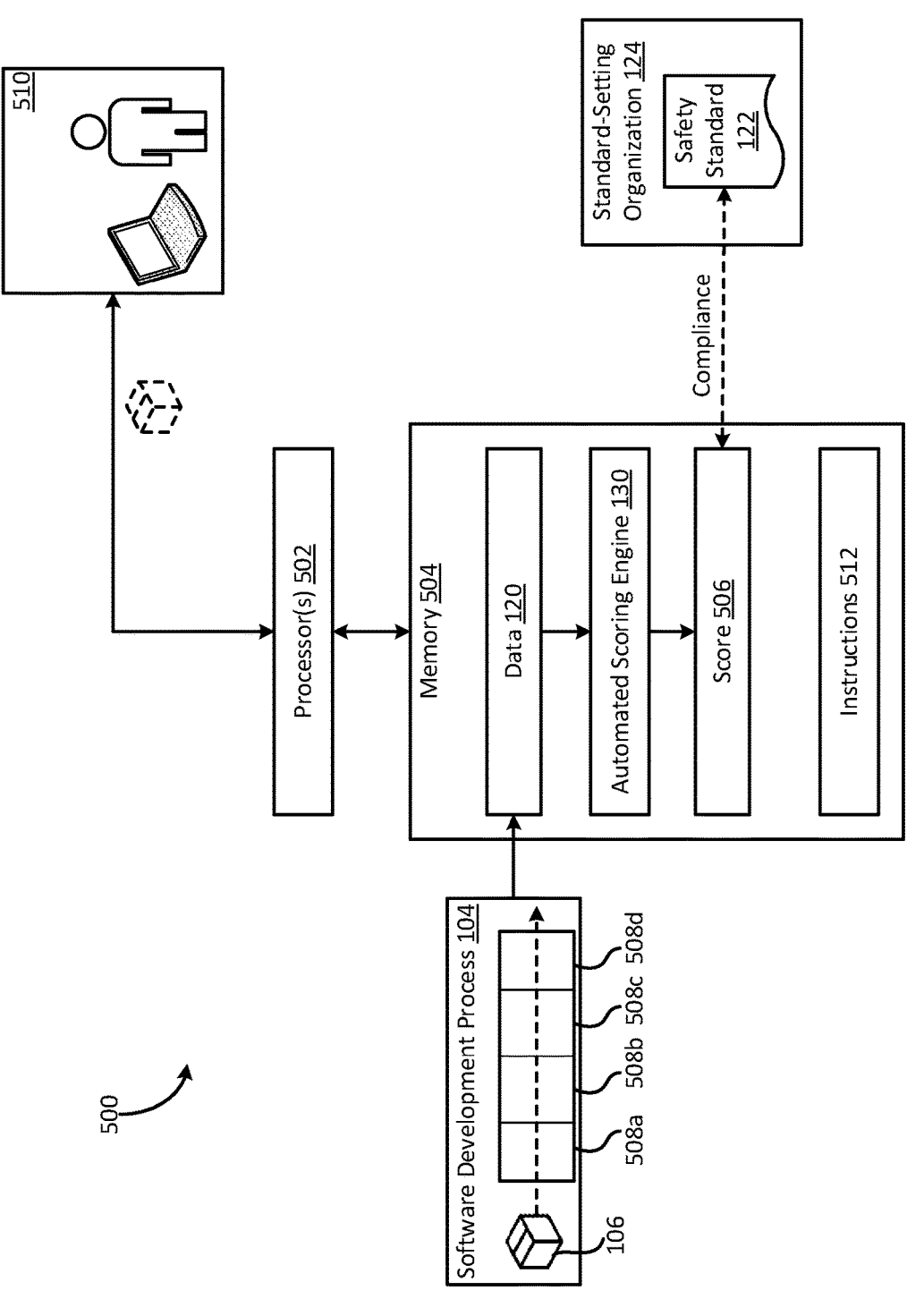
FIG. 5 is a block diagram of an example of a system for providing automated functional-safety evaluation and deployment of a software package according to some aspects of the present disclosure.

FIG. 5 is a block diagram of an example of a system 500 for providing automated functional-safety evaluation and deployment of a software package according to some aspects of the present disclosure. The system 500 includes a processor 502 communicatively coupled to a memory 504. The processor 502 and memory 504 are both hardware that can be integrated into a single computing device or can be distributed from one another.

The processor 502 is hardware that can include one processing device or multiple processing devices. Examples of the processor 502 include a Field-Programmable Gate Array (FPGA), an application-specific integrated circuit (ASIC), and a microprocessor. The processor 502 can execute instructions 512 stored in the memory 504 to perform one or more operations. In some examples, the instructions 512 can include processor-specific instructions generated by a compiler or an interpreter from code written in any suitable computer-programming language, such as C, C++, C#, and Java. In some examples, the instructions 512 may correspond to the automated scoring engine 130, even though they are shown separately in FIG. 5.

The memory 504 can include one memory device or multiple memory devices. The memory 504 can be volatile or non-volatile (i.e., the memory 504 can retain stored information when powered off). Examples of the memory 504 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 502 with the instructions 512 or other program code. Examples of a computer-readable medium include magnetic disks, memory chips, ROM, random-access memory (RAM), an ASIC, a configured processor, optical storage, or any other medium from which a computer processor can read the instructions 512.

The processor 502 can execute the instructions 512 to perform some or all of the operations described herein. For example, the processor 502 can execute an automated scoring engine 130 to analyze data 120 associated with different phases 508a-d of a software development process 104 for a software package 106. The software development process 104 can include any number of distinct development phases. Based on this analysis, the processor 402 can generate a score 506. The score 506 can indicate compliance of the software package 106 with a functional safety standard 122 issued by a standard-setting organization 124. The score 506 may be an overall score or a subscore. The processor 502 can then automatically control deployment of the software package 106 to an entity 510 (e.g., an end user) based on the score 506. For example, the processor 502 can compare the score 506 to a predefined threshold. If the score 506 exceeds the predefined threshold, the processor 502 can deploy the software package 106 to the entity 510. This is represented in FIG. 5 by a dashed version of the software package 106. Deploying a software package 106 to an entity 510 may involve pushing the software package 106 to the entity, providing the software package 106 to the entity 510 for download, or otherwise making the software package 106 available to the entity 510.

FIG. 6 is a flowchart of an example of a process for providing automated functional-safety evaluation and deployment of a software package according to some aspects of the present disclosure. Other examples may involve more, fewer, or different operations than are shown in FIG. 6. The operations of FIG. 6 are described below with respect to the components of FIG. 5 described above.

In block 602, a processor 502 executes an automated scoring engine 130 to analyze data 120 associated with different phases 508a-d of a software development process 104 for a software package 106. The software development process 104 can include one or more development phases. Based on this analysis, the processor 402 can generate a score 506. The score 506 can indicate compliance of the software package 106 with a functional safety standard 122 issued by a standard-setting organization 124. The score 506 may be an overall score or a subscore.

In block 604, the processor 502 automatically controls deployment of the software package 106 to an entity 510 based on the score 506. For example, the processor 502 can compare the score 506 to a predefined threshold, which may be selected by the entity 510 in some examples. If the score 506 meets or exceeds the predefined threshold, the processor 502 can deploy the software package 106 to the entity 510, for example by making the software package 106 available to the entity 510 for download.

In some examples, the processor 502 may execute or be included in an automated deployment controller, such as the automated deployment controller 138 of FIG. 1. If the automated deployment controller is software, the processor 502 may execute the automated deployment controller to automatically control deployment of the software package 106. If the automated deployment controller is a hardware system, the processor may be part of the hardware system and operate to automatically control deployment of the software package 106.

FIG. 7 is a flowchart of an example of a process for generating subscores and an overall score for a software package according to some aspects of the present disclosure. Other examples may involve more, fewer, or different operations than are shown in FIG. 7. The operations of FIG. 7 are described below with respect to the components of FIGS. 1 and 5 described above.

In block 702, a processor 502 receives data 120 associated with different phases 508*a-d* of a software development process 104 for a software package 106. For example, the processor 502 can obtain the data 120 from one or more of the datastores 118*a-b* shown in FIG. 1.

In block 704, the processor 502 determines, based on a first set of rules, that a first subset of the data 120 corresponds to a first set of normative requirements defined in a functional safety standard 122. The first set of rules may, for example, be a subset of the rules 132 shown in FIG. 1. The first set of normative requirements can include one or more normative requirements.

In block 706, the processor 502 generates, based on the first subset of data, a first subscore indicating a degree to which the software package 106 satisfies the first set of normative requirements. The first subscore may be one of the subscores 136 of FIG. 1. The processor 502 may execute an automated scoring engine 130 to produce the first subscore.

In block 708, the processor 502 determines, based on a second set of rules, that a second subset of the data 120 corresponds to a second set of normative requirements defined in a functional safety standard 122. The second set of rules may, for example, be a subset of the rules 132 shown in FIG. 1. The second set of normative requirements can include one or more normative requirements.

In some examples, the second subset of the data 120 may be completely different than the first subset of the data 120. Alternatively, the second subset of the data 120 may have some data in common with the first subset of the data 120. Similarly, the second set of rules may be completely different than the first set of rules. Alternatively, the second set of rules may have some rules in common with the first set of rules. Likewise, the second set of normative requirements may be completely different from the first set of normative requirements. Alternatively, the second set of normative requirements may have some normative requirements in common with the first set of normative requirements.

In block 710, the processor 502 generates, based on the second subset of data, a second subscore indicating a degree to which the software package 106 satisfies the second set of normative requirements. The second subscore may be one of the subscores 136 of FIG. 1. The processor 502 may execute an automated scoring engine 130 to produce the second subscore. The second subscore can be the same as, or different than, the first subscore.

In block 712, the processor 502 generates an overall score 134 for the software package 106 based on the first subscore and second subscores. For example, the processor 502 can add together the first subscore and the second subscore to produce the overall score 134. The overall score 134 can indicate an overall degree to which the software package 106 satisfies the functional safety standard 122.

In block 714, the processor 502 outputs the overall score 134 (e.g., in a graphical user interface). The processor 502 can additionally or alternatively output the first subscore, the second subscore, or both of these. In some examples, the processor 502 can output one or more of the scores to a user, such as a human evaluator 126. This can assist the user in evaluating the software package's compliance with the functional safety standard 122. The processor 502 may additionally or alternatively output one or more of the scores to an automated deployment controller 138 for controlling deployment of the software package 106 to one or more entities such as end users.

It will be appreciated that while various examples are described herein with respect to functional safety standards, similar principles can be applied to other types of standards such as quality standards (e.g., for software development). Likewise, while various examples are described herein with respect to normative requirements, similar principles can be applied to other types of requirements. These other implementations are therefore also considered within the scope of the present disclosure.

In some aspects, automated functional-safety evaluation and deployment of a software package can be performed according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: execute an automated scoring engine configured to analyze data associated with different phases of a software development process for a software package and generate a score indicating compliance of the software package with a functional safety standard issued by a standard-setting organization; and automatically control deployment of the software package to an entity based on the score.

Example #2: The non-transitory computer-readable medium of Example #1, further comprising program code that is executable by the one or more processors for causing the one or more processors to: determine that the score meets or exceeds a first threshold associated with a first entity and responsively deploy the software package to the first entity, the first entity being capable of customizing the first threshold; and determine that the score is below a second threshold associated with a second entity and responsively prevent deployment of the software package to the second entity, the second entity being capable of customizing the second threshold.

Example #3: The non-transitory computer-readable medium of any of Examples #1-2, further comprising program code that is executable by the one or more processors for causing the one or more processors to: generate a graphical user interface indicating the score for a user.

Example #4: The non-transitory computer-readable medium of any of Examples #1-3, wherein the score is an overall score, and further comprising program code that is executable by the one or more processors for causing the one or more processors to: execute the automated scoring engine to determine a plurality of subscores corresponding to different areas of evaluation defined in the functional safety standard, each subscore corresponding to a respective area of evaluation and indicating a degree to which the software package satisfies one or more normative requirements associated with the respective area; and generate the overall score by combining the plurality of subscores.

Example #5: The non-transitory computer-readable medium of Example #4, wherein the different areas for evaluation include design, programming, verification, and testing of the software package.

Example #6: The non-transitory computer-readable medium of Example #4, wherein the automated scoring engine is configured to, for each respective area of evaluation:

determine the subscore for the respective area of evaluation by applying a respective set of rules to a corresponding subset of the data.

Example #7: The non-transitory computer-readable medium of any of Examples #1-6, wherein the score is a subscore that corresponds to an individual evaluation area defined in the functional safety standard, and further comprising program code that is executable by the one or more processors for causing the one or more processors to: determine a subscore threshold selected by the entity for the individual evaluation area; determine whether the subscore meets or exceeds the subscore threshold; and based on determining that the subscore meets or exceeds the subscore threshold, automatically deploy the software package to the entity; or based on determining that the subscore is below the subscore threshold, automatically prevent deployment of the software package to the entity.

Example #8: The non-transitory computer-readable medium of Example #7, wherein the subscore threshold is a first subscore threshold, wherein the entity is a first entity, and further comprising program code that is executable by the one or more processors for causing the one or more processors to: determine a second subscore threshold selected by a second entity for the individual evaluation area, the second subscore threshold being different from the first subscore threshold; determine whether a second subscore computed by the automated scoring engine meets or exceeds the second subscore threshold; and based on determining that the second subscore meets or exceeds the second subscore threshold, automatically deploy the software package to the second entity; or based on determining that the second subscore is below the second subscore threshold, automatically prevent deployment of the software package to the second entity.

Example #9: The non-transitory computer-readable medium of any of Examples #1-8, wherein the functional safety standard defines functional goals for the software package but excludes specific details describing how to determine whether those functional goals are met by the software package, and wherein the automated scoring engine is configured to: determine results of a set of software development operations performed during the different phases of the software development process for the software package; apply rules the results to generate the score, the score reflecting a degree to which the functional goals are met by the software package.

Example #10: A method comprising: executing, by one or more processors, an automated scoring engine configured to analyze data associated with different phases of a software development process for a software package and generate a score indicating compliance of the software package with a functional safety standard issued by a standard-setting organization; and automatically controlling, by the one or more processors, deployment of the software package to an entity based on the score.

Example #11: The method of Example #10, further comprising: determining, by the one or more processors, that the score meets or exceeds a first threshold associated with a first entity and responsively deploy the software package to the first entity, the first entity being capable of customizing the first threshold; and determining, by the one or more processors, that the score is below a second threshold associated with a second entity and responsively prevent deployment of the software package to the second entity, the second entity being capable of customizing the second threshold.

Example #12: The method of any of Examples #10-11, further comprising: generating, by the one or more processors, a graphical user interface indicating the score for a user.

Example #13: The method of any of Examples #10-12, wherein the score is an overall score, and further comprising: determining, by the one or more processors, a plurality of subscores corresponding to different areas of evaluation defined in the functional safety standard, each subscore corresponding to a respective area of evaluation and indicating a degree to which the software package satisfies one or more normative requirements associated with the respective area; and generating, by the one or more processors, the overall score by combining the plurality of subscores.

Example #14: The method of Examples #13, wherein the different areas for evaluation include design, programming, verification, and testing of the software package.

Example #15: The method of Examples #13, further comprising, for each respective area of evaluation: determining, by the one or more processors, the subscore for the respective area of evaluation by applying a respective set of rules to a corresponding subset of the data.

Example #16: The method of any of Examples #10-15, wherein the score is a subscore that corresponds to an individual evaluation area defined in the functional safety standard, and further comprising: determining, by the one or more processors, a subscore threshold selected by the entity for the individual evaluation area; determining, by the one or more processors, whether the subscore meets or exceeds the subscore threshold; and based on determining that the subscore meets or exceeds the subscore threshold, automatically deploying, by the one or more processors, the software package to the entity; or based on determining that the subscore is below the subscore threshold, automatically preventing, by the one or more processors, deployment of the software package to the entity.

Example #17: The method of Example #16, wherein the subscore threshold is a first subscore threshold, wherein the entity is a first entity, and further comprising program: determining, by the one or more processors, a second subscore threshold selected by a second entity for the individual evaluation area, the second subscore threshold being different from the first subscore threshold; determining, by the one or more processors, whether a second subscore computed by the automated scoring engine meets or exceeds the second subscore threshold; and based on determining that the second subscore meets or exceeds the second subscore threshold, automatically deploying, by the one or more processors, the software package to the second entity; or based on determining that the second subscore is below the second subscore threshold, automatically preventing, by the one or more processors, deployment of the software package to the second entity.

Example #18: The method of any of Examples #10-17, wherein the functional safety standard defines functional goals for the software package but excludes specific details describing how to determine whether those functional goals are met by the software package, and further comprising: determining, by the one or more processors, results of a set of software development operations performed during the different phases of the software development process for the software package; applying, by the one or more processors, rules the results to generate the score, the score reflecting a degree to which the functional goals are met by the software package.

Example #19: A system comprising: one or more processors; and one or more memories including instructions that are executable by the one or more processors for causing the one or more processors to: execute an automated scoring engine configured to analyze data associated with different phases of a software development process for a software package and generate a score indicating compliance of the software package with a functional safety standard issued by a standard-setting organization; and automatically control deployment of the software package to an entity based on the score.

Example #20: The system of Example #19, wherein the score is an overall score, and wherein the one or more memories further include instructions that are executable by the one or more processors for causing the one or more processors to: determine a plurality of subscores corresponding to different areas of evaluation defined in the functional safety standard, each subscore corresponding to a respective area of evaluation and indicating a degree to which the software package satisfies one or more normative requirements associated with the respective area; and generate the overall score by combining the plurality of subscores.

Example #21: A non-transitory computer-readable medium comprising program code that is executable by one or more processors for causing the one or more processors to: receive data associated with different phases of a software development process for a software package; determine, based on a first set of rules, that a first subset of the data corresponds to a first set of normative requirements defined in a functional safety standard; generate, based on the first subset of the data, a first subscore indicating a degree to which the software package satisfies the first set of normative requirements; determine, based on a second set of rules, that a second subset of the data corresponds to a second set of normative requirements defined in the functional safety standard; generate, based on the second subset of the data, a second subscore indicating a degree to which the software package satisfies the second set of normative requirements; generate an overall score for the software package based on the first subscore and the second subscore, the overall score indicating an overall degree to which the software package satisfies the functional safety standard; and output the overall score to a user to assist the user in evaluating the software package's compliance with the functional safety standard.

Example #22: The non-transitory computer-readable medium of Example #21, further comprising program code that is executable by the one or more processors for causing the one or more processors to generate the overall score by applying a weighted algorithm to the first subscore and the second subscore, the weighted algorithm being configured to impart a higher weight to the first subscore than the second subscore.

Example #23: The non-transitory computer-readable medium of any of Examples #21-22, further comprising program code that is executable by the one or more processors for causing the one or more processors to control deployment of the software package to an entity based on the overall score, the first subscore, or the second subscore.

Example #24: The non-transitory computer-readable medium of any of Examples #21-22, further comprising program code that is executable by the one or more processors for causing the one or more processors to control deployment of the software package to the entity based on the overall score, the first subscore, and the second subscore.

Example #25: The non-transitory computer-readable medium of any of Examples #21-24, wherein the functional safety standard defines functional goals for the software package.

Example #26: The non-transitory computer-readable medium of any of Examples #21-25, further comprising program code that is executable by the one or more processors for causing the one or more processors to: receive a selection of a custom value for a score threshold from an entity; determine whether a score associated with the software package meets or exceeds the custom value, the score being the overall score or the first subscore; and control deployment of the software package to the entity based on whether the score meets or exceeds the custom value.

Example #27: A method comprising: receiving, by one or more processors, data associated with different phases of a software development process for a software package; determining, by the one or more processors and based on a first set of rules, that a first subset of the data corresponds to a first set of normative requirements defined in a functional safety standard; generating, by the one or more processors and based on the first subset of the data, a first subscore indicating a degree to which the software package satisfies the first set of normative requirements; determining, by the one or more processors and based on a second set of rules, that a second subset of the data corresponds to a second set of normative requirements defined in the functional safety standard; generating, by the one or more processors and based on the second subset of the data, a second subscore indicating a degree to which the software package satisfies the second set of normative requirements; generating, by the one or more processors, an overall score for the software package based on the first subscore and the second subscore, the overall score indicating an overall degree to which the software package satisfies the functional safety standard; and outputting, by the one or more processors, the overall score to a user to assist the user in evaluating the software package's compliance with the functional safety standard.

Example #28: The method of Example #27, further comprising generating the overall score by applying a weighted algorithm to the first subscore and the second subscore, the weighted algorithm being configured to impart a higher weight to the first subscore than the second subscore.

Example #29: The method of any of Examples #27-28, further comprising controlling deployment of the software package to an entity based on the overall score, the first subscore, or the second subscore.

Example #30: The method of any of Examples #27-28, further comprising controlling deployment of the software package to the entity based on the overall score and the first subscore.

Example #31: The method of any of Examples #27-30, wherein the functional safety standard defines functional goals for the software package.

Example #32: The method of any of Examples #27-31, further comprising: receiving a selection of a custom value for a score threshold from an entity; determining whether a score associated with the software package meets or exceeds the custom value, the score being the overall score or the first subscore; and controlling deployment of the software package to the entity based on whether the score meets or exceeds the custom value.

Example #33: A system comprising: one or more processors; and one or more memories including instructions that are executable by the one or more processors for causing the one or more processors to: receive data associated with different phases of a software development process for a software package; determine, based on a first set of rules, that a first subset of the data corresponds to a first set of normative requirements defined in a functional safety standard; generate, based on the first subset of the data, a first subscore indicating a degree to which the software package satisfies the first set of normative requirements; determine, based on a second set of rules, that a second subset of the data corresponds to a second set of normative requirements defined in a functional safety standard; generate, based on the second subset of the data, a second subscore indicating a degree to which the software package satisfies the second set of normative requirements; generate an overall score for the software package based on the first subscore and the second subscore, the overall score indicating an overall degree to which the software package satisfies the functional safety standard; and output the overall score to a user to assist the user in evaluating the software package's compliance with the functional safety standard.

Example #34: A system comprising: means for analyzing data associated with different phases of a software development process for a software package and generate a score indicating compliance of the software package with a functional safety standard issued by a standard-setting organization; and means for automatically controlling deployment of the software package to an entity based on the score.

Example #35: A method comprising: executing, by one or more processors, an automated scoring engine configured to analyze data associated with different phases of a software development process for a software package and generate a score indicating compliance of the software package with a quality standard issued by a standard-setting organization; and automatically controlling, by one or more processors, deployment of the software package to an entity based on the score.

Example #36: A non-transitory computer-readable medium comprising program code that is executable by one or more processors for causing the one or more processors to perform the method of Example #35.

Example #37: A method comprising: receiving, by one or more processors, data associated with different phases of a software development process for a software package; determining, by the one or more processors and based on a first set of rules, that a first subset of the data corresponds to a first set of requirements defined in a quality standard; generating, by the one or more processors and based on the first subset of the data, a first subscore indicating a degree to which the software package satisfies the first set of requirements; determine, by the one or more processors and based on a second set of rules, that a second subset of the data corresponds to a second set of requirements defined in the quality standard; generating, by the one or more processors and based on the second subset of the data, a second subscore indicating a degree to which the software package satisfies the second set of requirements; generating, by the one or more processors, an overall score for the software package based on the first subscore and the second subscore, the overall score indicating an overall degree to which the software package satisfies the quality standard; and outputting, by the one or more processors, the overall score to a user to assist the user in evaluating the software package's compliance with the quality standard.

Example #38: A non-transitory computer-readable medium comprising program code that is executable by one or more processors for causing the one or more processors to perform the method of Example #37.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:

execute a software test on a software package to generate a test result;

generate a score indicating compliance of the software package with a functional safety standard issued by a standard-setting organization, by applying a predefined set of rules to data generated during different phases of a software development process for the software package, wherein the data includes the test result; and automatically control deployment of the software package to a first entity and a second entity based on the score, wherein automatically controlling the deployment of the software package involves transmitting the software package over a network to a first production server in response to determining that the score meets or exceeds a first threshold provided by the first entity, and wherein automatically controlling the deployment of the software package involves preventing transmission of the software package over the network to a second production server in response to determining that the score is below a second threshold provided by the second entity, the second threshold being different from the first threshold and the second entity being different from the first entity, wherein the first production server is configured to provide the software package for download to the first entity, and wherein the second production server is configured to provide the software package for download to the second entity.

2. The non-transitory computer-readable medium of claim 1, further comprising program code that is executable by the one or more processors for causing the one or more processors to:

determine that the score meets or exceeds the first threshold associated with the first entity and responsively deploy the software package to the first entity, the first entity being capable of customizing the first threshold; and determine that the score is below the second threshold associated with the second entity and responsively prevent deployment of the software package to the second entity, the second entity being capable of customizing the second threshold.

3. The non-transitory computer-readable medium of claim 1, further comprising program code that is executable by the one or more processors for causing the one or more processors to:

generate a graphical user interface indicating the score for a user.

4. The non-transitory computer-readable medium of claim 1, wherein the score is an overall score, and further comprising program code that is executable by the one or more processors for causing the one or more processors to:

determine a plurality of subscores corresponding to different areas of evaluation defined in the functional safety standard, each subscore corresponding to a respective area of evaluation and indicating a degree to which the software package satisfies one or more normative requirements associated with the respective area; and generate the overall score by combining the plurality of subscores.

5. The non-transitory computer-readable medium of claim 4, wherein the different areas for evaluation include design, programming, verification, and testing of the software package.

6. The non-transitory computer-readable medium of claim 4, further comprising program code that is executable by the one or more processors for causing the one or more processors to, for each respective area of evaluation:

determine the subscore for the respective area of evaluation by applying a respective set of rules to a corresponding subset of the data.

7. The non-transitory computer-readable medium of claim 1, wherein the score is a first subscore that corresponds to an individual evaluation area defined in the functional safety standard, and further comprising program code that is executable by the one or more processors for causing the one or more processors to:

determine a first subscore threshold selected by the first entity for the individual evaluation area;

determine whether the first subscore meets or exceeds the first subscore threshold; and based on determining that the subscore meets or exceeds the first subscore threshold, automatically deploy the software package to the first entity.

8. The non-transitory computer-readable medium of claim 7, further comprising program code that is executable by the one or more processors for causing the one or more processors to:

determine a second subscore threshold selected by the second entity for the individual evaluation area, the second subscore threshold being different from the first subscore threshold;

determine whether a second subscore meets or exceeds the second subscore threshold; and based on determining that the second subscore is below the second subscore threshold, automatically prevent deployment of the software package to the second entity.

9. The non-transitory computer-readable medium of claim 1, wherein the functional safety standard defines functional goals for the software package but excludes specific details describing how to determine whether those functional goals are met by the software package, and further comprising program code that is executable by the one or more processors for causing the one or more processors to:

determine results of a set of software development operations performed during the different phases of the software development process for the software package; and apply the predefined set of rules to the results to generate the score, the score reflecting a degree to which the functional goals are met by the software package.

10. A method comprising:

generating, by one or more processors, a score indicating compliance of a software package with a functional safety standard issued by a standard-setting organization, by applying a predefined set of rules to data generated during different phases of a software development process for the software package; and automatically controlling, by the one or more processors, deployment of the software package to a first entity and a second entity based on the score, wherein automatically controlling the deployment of the software package involves transmitting the software package over a network to a first production server in response to determining that the score meets or exceeds a first threshold provided by the first entity, and wherein automatically controlling the deployment of the software package involves preventing transmission of the software package over the network to a second production server in response to determining that the score is below a second threshold provided by the second entity, the second threshold being different from the first threshold and the second entity being different from the first entity, wherein the first production server is configured to provide the software package for download to the first entity, and wherein the second production server is configured to provide the software package for download to the second entity.

11. The method of claim 10, further comprising:

determining, by the one or more processors, that the score meets or exceeds the first threshold associated with the first entity and responsively deploy the software package to the first entity, the first entity being capable of customizing the first threshold; and determining, by the one or more processors, that the score is below the second threshold associated with the second entity and responsively prevent deployment of the software package to the second entity, the second entity being capable of customizing the second threshold.

12. The method of claim 10, further comprising:

generating, by the one or more processors, a graphical user interface indicating the score for a user.

13. The method of claim 10, wherein the score is an overall score, and further comprising:

determining, by the one or more processors, a plurality of subscores corresponding to different areas of evaluation defined in the functional safety standard, each subscore corresponding to a respective area of evaluation and indicating a degree to which the software package satisfies one or more normative requirements associated with the respective area; and generating, by the one or more processors, the overall score by combining the plurality of subscores.

14. The method of claim 13, wherein the different areas for evaluation include design, programming, verification, and testing of the software package.

15. The method of claim 13, further comprising, for each respective area of evaluation:

determining, by the one or more processors, the subscore for the respective area of evaluation by applying a respective set of rules to a corresponding subset of the data.

16. The method of claim 10, wherein the score is a first subscore that corresponds to an individual evaluation area defined in the functional safety standard, and further comprising:

determining, by the one or more processors, a first subscore threshold selected by the first entity for the individual evaluation area;

determining, by the one or more processors, whether the first subscore meets or exceeds the first subscore threshold; and based on determining that the first subscore meets or exceeds the first subscore threshold, automatically deploying, by the one or more processors, the software package to the first entity.

17. The method of claim 16, further comprising:

determining, by the one or more processors, a second subscore threshold selected by the second entity for the individual evaluation area, the second subscore threshold being different from the first subscore threshold;

determining, by the one or more processors, whether a second subscore meets or exceeds the second subscore threshold; and based on determining that the second subscore is below the second subscore threshold, automatically preventing, by the one or more processors, deployment of the software package to the second entity.

18. The method of claim 10, wherein the functional safety standard defines functional goals for the software package but excludes specific details describing how to determine whether those functional goals are met by the software package, and further comprising:

determining, by the one or more processors, results of a set of software development operations performed during the different phases of the software development process for the software package; and applying, by the one or more processors, the predefined set of rules to the results to generate the score, the score reflecting a degree to which the functional goals are met by the software package.

19. A system comprising:

one or more processors; and one or more memories including instructions that are executable by the one or more processors for causing the one or more processors to:

generate a score indicating compliance of a software package with a functional safety standard issued by a standard-setting organization, by applying a predefined set of rules to data generated during different phases of a software development process for the software package; and automatically control deployment of the software package to a first entity and a second entity based on the score, wherein automatically controlling the deployment of the software package involves transmitting the software package over a network to a first production server in response to determining that the score meets or exceeds a first threshold provided by the first entity, and wherein automatically controlling the deployment of the software package involves preventing transmission of the software package over the network to a second production server in response to determining that the score is below a second threshold provided by the second entity, the second threshold being different from the first threshold and the second entity being different from the first entity, wherein the first production server is configured to provide the software package for download to the first entity, and wherein the second production server is configured to provide the software package for download to the second entity.

20. The system of claim 19, wherein the score is an overall score, and wherein the one or more memories further include instructions that are executable by the one or more processors for causing the one or more processors to:

determine a plurality of subscores corresponding to different areas of evaluation defined in the functional safety standard, each subscore corresponding to a respective area of evaluation and indicating a degree to which the software package satisfies one or more normative requirements associated with the respective area; and generate the overall score by combining the plurality of subscores.

\* \* \* \* \*